US007120426B2

(12) United States Patent
Link, II et al.

(10) Patent No.: US 7,120,426 B2
(45) Date of Patent: Oct. 10, 2006

(54) AUTOMATIC TELEPHONE SERVICE FORWARDING DEVICE

(75) Inventors: Charles M. Link, II, Roswell, GA (US); Donald M. Cardina, Lawrenceville, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 583 days.

(21) Appl. No.: 10/376,380

(22) Filed: Feb. 28, 2003

(65) Prior Publication Data

US 2003/0181202 A1 Sep. 25, 2003

Related U.S. Application Data

(62) Division of application No. 09/267,727, filed on Mar. 15, 1999, now abandoned.

(51) Int. Cl.
H04M 3/42 (2006.01)
(52) U.S. Cl. ............... 455/417; 455/414.1; 455/414.3; 455/415; 455/418; 455/445
(58) Field of Classification Search ............... 455/417, 455/573, 575.1, 90.3, 415, 445, 432.3, 418, 455/435.1–435.3, 456.1–456.3, 456.6, 457, 455/465–466, 41.2, 550.1, 556.1–556.2, 455/557, 564–565, 566, 414.1–414.5, 419–420, 455/436–440, 459–461, 552.1, 553.1–554.2; 379/210–212, 202–205, 111–114, 121–123, 379/144–145, 356

See application file for complete search history.

(56) References Cited

U.S. PATENT DOCUMENTS 5,157,660 A 10/1992 Kuwahara et al. ......... 370/95.1
5,524,276 A 6/1996 Littig et al. ................ 455/33.1
5,539,807 A 7/1996 Ghisler et al. ................ 379/58
5,812,946 A 9/1998 Nakabayashi et al. ...... 455/426

(Continued)

FOREIGN PATENT DOCUMENTS

GB 2 282 735 4/1995

(Continued)

*Primary Examiner*—Pablo N. Tran
(74) *Attorney, Agent, or Firm*—Cantor Colburn LLP

(57) ABSTRACT

An automatic telephone service forwarding device including a base or enclosure defining a socket for receiving a wireless telephone. Upon detecting the presence of the wireless telephone in the socket, the device automatically forwards telephone service for the wireless telephone to a previously-stored forwarding directory number, typically the directory number of a wireline unit located nearby. Alternatively, the automatic telephone service forwarding device may be incorporated directly into a wireless telephone. In this case, the wireless telephone includes a "forward" button and a scrollable list of forwarding telephone numbers. The automatic telephone service forwarding device may also be configured to automatically select certain forwarding directory numbers from the list in accordance with a predefined time-based profile. The automatic telephone service forwarding device may forward the telephone service by causing the wireless telephone to transmit a forwarding message to a telephone redirection device on an overhead data channel associated with a wireless communications network. Alternatively, the automatic telephone service forwarding device may forward the telephone service by placing a telephone call to the call redirection device. The call redirection device may include automatic call redirection equipment that is configured to enter forwarding instructions into a home location register for the wireless telephone by emulating a visitor location register in which the wireless telephone is attempting to register for roaming service.

23 Claims, 10 Drawing Sheets

U.S. PATENT DOCUMENTS

| | | | |
|---|---|---|---|
| 5,903,833 A * | 5/1999 | Jonsson et al. | 455/417 |
| 5,920,816 A | 7/1999 | Khan et al. | 455/435 |
| 5,933,774 A | 8/1999 | Bertocci | 455/417 |
| 5,978,673 A | 11/1999 | Alperovich et al. | 455/417 |
| 6,049,719 A | 4/2000 | Schroter | 455/462 |
| 6,091,948 A * | 7/2000 | Carr et al. | 455/414.1 |
| 6,091,949 A | 7/2000 | Sanchez | 455/417 |
| 6,151,500 A | 11/2000 | Cardina et al. | 455/435 |
| 6,167,271 A | 12/2000 | Parker et al. | 455/445 |
| 6,188,888 B1 * | 2/2001 | Bartle et al. | 455/417 |
| 6,253,095 B1 * | 6/2001 | Ushida | 455/565 |
| 6,363,248 B1 * | 3/2002 | Silverman | 455/417 |
| 6,625,423 B1 * | 9/2003 | Wang | 455/74.1 |

FOREIGN PATENT DOCUMENTS

GB     2 284 727     6/1995

* cited by examiner

AUTOMATIC TELEPHONE SERVICE FORWARDING DEVICE

RELATED APPLICATIONS

This application is a divisional of U.S. application Ser. No. 09/267,727, entitled "Automatic Telephone Service Forwarding Device," filed Mar. 15, 1999, now abandoned which is incorporated herein by reference.

FIELD OF THE INVENTION

This invention generally relates to telecommunication service and, more particularly, to a device that automatically forwards telephone service upon detecting a triggering event, such as receipt of a wireless telephone within a socket defined by the device.

BACKGROUND OF THE INVENTION

In recent years, telephone networks have been installed throughout most of the industrialized world. Initially, this telecommunication infrastructure was implemented through a land-based or landline system known as the public switched telephone network (PSTN). The landline PSTN transmits telephone calls over land-based lines, such as copper wires and fiber optic cables. Communication devices that operate in the landline PSTN, such as telephones and other devices that have telephone equipment within them, are typically referred to as landline or wireline units or telephones.

More recently, a wireless telecommunications infrastructure has been installed in addition to the previously existing landline PSTN. Although these two systems are functionally integrated, there remain some important distinctions. First, wireline units typically remain stationary because they are tied to land-based telephone lines. Wireless units, on the other hand, typically travel from place to place with the owner. For example, many wireless units are configured for installation in automobiles and others are configured to be carried on one's person. Second, wireline telephone service has not traditionally included time-based charges for many services, whereas wireless telephone service has typically involved time-based or "air time" charges for virtually all uses of the wireless telephone.

Specifically, landline telephone service has not traditionally involved time-based charges for received telephone calls. In additional, local landline telephone service has traditionally been provided on a flat-rate basis, which avoids time-based charges for local originated telephone calls. The result of these landline billing policies is that only originated long-distance telephone calls have traditionally involved time-based charges in the landline PSTN; local telephone calls and received long distance calls have not traditionally involved time-based charges. Wireless telephone service, on the other hand, has typically involved time-based or "airtime" charges for virtually all uses of the wireless telephone. This usually means that receiving a telephone call on one's wireless unit is a more expensive option than receiving the same telephone call on a wireline unit.

The practical result of these differences in wireline and wireless billing practices has been to encourage many people to receive telephone calls on wireline units whenever possible, and to use their wireless units only when landline service is unavailable. For example, to save air-time charges, some subscribers may ask calling parties to call them first at a landline telephone number, and if they don't answer, then them try them at a wireless telephone number. In addition, if a wireless telephone call is received while the called party is near a landline telephone, the called party may ask the calling party to hang up and a call back on the landline telephone.

Many telephone service subscribers find these practices cumbersome because calling parties must know multiple telephone numbers for reaching the subscriber. In response, telephone service providers have offered "personal number" or "one number" telephone services, which allow calling parties to dial a single telephone number to reach a subscriber on a predefined set of wireline and/or wireless telephones. To implement this service, the telephone service provider takes control over all telephone calls directed to the subscriber's "one number," and rings the calls on the various telephones in a predefined order. That order may vary based on the time of day, day of week, and other factors, such as whether a particular wireless unit is powered on, whether a particular wireless unit is present in a particular location, whether a particular wireless unit has been placed in its battery charger, and so forth. For example, the subscriber may instruct the service provider to ring an incoming telephone call first on the subscriber's wireline, and if that unit is not answered, to ring the call on the subscriber's wireless unit.

While this type of "one number" service is effective at reducing air-time charges, it has a number of drawbacks. First, the service provider must be given advance notice of all of the directory numbers for trying to reach a particular subscriber. Although the subscriber may give the service provider several wireline directory numbers where the subscriber is frequently located, such as home and work, the "one number" service will not be able to reach the subscriber on wireline units at other locations that the subscriber visits less frequently. Second, calling parties often experience delays while the service provider rings at a first location, then at a second location, an so forth. Third, taking control over incoming telephone calls occupies telecommunication resources and, as a result, "one number" service typically involves a premium charge.

To overcome these disadvantages, telephone service providers may offer simplified telephone call forwarding. For example, some wireless telephone service plans allow a subscriber to easily forward telephone service using a pre-defined code, such as "*71+ forwarding number." The forwarded wireless service can later be unforwarded using another predefined code, such as "*72." This allows the subscriber to quickly forward incoming wireless telephone calls to a wireline unit while the subscriber is located near the wireline unit. When the subscriber leaves the area, he or she can quickly unforward the wireless telephone service.

Although this type of simplified call forwarding service has certain advantages, many wireless subscribers fail to use it effectively. In many cases, the subscribers simply fail to take the time to learn the forwarding and unforwarding codes. In other instances, subscribers may forget to enter the required forwarding code. And in other situations, it may be inconvenient for the subscriber to ask for or look up the telephone number of a wireline unit where the subscriber is temporarily located. That is, many people won't go to the trouble of forwarding their wireless telephone service if they have to look up or ask for the forwarding number. As a result, even simplified forwarding services are used most often with wireline directory numbers that the wireless subscriber has memorized.

Accordingly, there is a need for even more convenient ways to temporarily forward wireless telephone service. In particular, there is a need for convenient ways to forward wireless telephone service to wireline units in locations that the wireless subscriber visits infrequently.

SUMMARY OF THE INVENTION

The present invention meets needs described above in an automatic telephone service forwarding device. For example, the device may include a base or enclosure defining a socket into which a subscriber may insert a wireless telephone. Upon detecting the presence of the wireless telephone in the socket, the device automatically forwards telephone service for the wireless telephone to a previously stored forwarding directory number, typically the directory number of a wireline unit located nearby. Thus, simply placing the wireless unit in the device automatically forwards telephone calls directed to the wireless unit to the nearby wireline unit. The wireless service remains forwarded until the wireless unit is subsequently powered on, which automatically unforwards the telephone service.

To illustrate use of the automatic telephone service forwarding device, a homeowner may obtain one of these devices, program it with the wireline directory number for the home, and place it in a convenient location where people entering the home will see it. Someone entering the home, such as a grown child paying a visit, can place his or her wireless telephone in the device during the visit. This will automatically forward the child's wireless telephone service to the home wireline directory number. When the visit it over, the child simply picks up his or her wireless unit and powers it on to unforward the telephone service.

The advantage of the automatic telephone service forwarding device is to make forwarding one's wireless telephone (or another type of telephone device) practically effortless. The wireless subscriber does not have to remember to enter a predefined forwarding code; he or she just places the wireless unit in the automatic telephone service forwarding device. This advantage is even more apparent when the subscriber is visiting an infrequently visited location. In this context, having an automatic telephone service forwarding device available avoids having to ask for or look up the nearby wireline directory number in order to forward the wireless telephone service to that directory number.

The invention may also be incorporated directly into a wireless telephone, rather than in a separate device. In this case, the invention includes a "forward" button and a scrollable list of forwarding telephone numbers. To reduce the need to frequently scroll to look for desired forwarding directory numbers, the wireless unit may be programmed to automatically select forwarding telephone numbers from the list based on the time of day, day of the week, and other factors. These automatically selected forwarding directory numbers are made current or focused for immediate selection by pressing the "forward" button. Although this approach for implementing the invention requires a certain amount of user manipulation, it does simplify the forwarding process by providing a "forward" button and allowing the subscriber to program the wireless unit with a large number of potential forwarding numbers. In particular, the number of scrollable forwarding numbers stored in the wireless unit may be substantially larger than the number of directory numbers accessed through traditional "one number" telephone service. The programmable profile for automatically changing the current or focused directory number also facilitates use of this alternative.

Generally described, the invention provides an automatic telephone service forwarding device. This device receives a forwarding directory number and a device directory number associated with a telephone device. The automatic telephone service forwarding device then detects a triggering event and, in response, automatically transmits a message instructing a telephone redirection device to forward telephone calls placed to the device directory number to the forwarding directory number.

The automatic telephone service forwarding device may receive the forwarding directory number by receiving a programming telephone device within a socket defined by the automatic telephone service forwarding device. The programming telephone device includes a data port that becomes in communication with a data port of the automatic telephone service forwarding device when the programming telephone device is received within the socket. In addition, the automatic telephone service forwarding device receives the forwarding directory number from the programming telephone device through communications over the data ports. For example, the programming telephone device may be a wireless telephone, and the data port of wireless telephone may be a touch-pin data contact. In this case, the data port of the automatic telephone service forwarding device may be a touch-pin data contact positioned to functionally connect with the data contact of the wireless telephone when the wireless telephone is received within the socket.

The automatic telephone service forwarding device may detect a triggering event by receiving the telephone device within the socket and detecting that the data port of the telephone device has become in communication with the data port of the automatic telephone service forwarding device. Similarly, the automatic telephone service forwarding device may receive the device directory number by receiving the telephone device within the socket, detecting that the data port of the telephone device has become in communication with the data port of the automatic telephone service forwarding device, and automatically reading the device directory number from the telephone device through communication between the data ports.

The automatic telephone service forwarding device may transmit the message instructing the telephone redirection device to forward telephone calls placed to the device directory number to the forwarding directory number by causing the telephone device to transmit a forwarding message to the telephone redirection device on an overhead data channel associated with a wireless communications network. In this case, the forwarding message includes the device directory number, the forwarding directory number, and an instruction indicating that the telephone calls placed to the device directory number are to be forwarded to the forwarding directory number. In addition, the telephone redirection device may be a home or visitor's location register in which the telephone device is registered for telephone service.

Alternatively, the automatic telephone service forwarding device may transmit the message instructing the telephone redirection device to forward telephone calls placed to the device directory number to the forwarding directory number by placing a telephone call to another type of telephone call redirection device. In this case, the automatic telephone service forwarding device transmits the device directory number, the forwarding directory number, and an instruction indicating that the telephone calls placed to the device directory number are to be forwarded to the forwarding directory number during the telephone call.

In addition, the telephone redirection device may include automatic call redirection equipment that receives the forwarding directory number and enters a flag into a home location register for the wireless unit indicating that an associated home mobile switching office is to request routing instructions from the automatic call redirection equipment for any telephone call subsequently received for the wireless unit. The automatic call redirection equipment typically implements this feature by emulating a visitor's location register. The automatic telephone service forwarding device typically communicates with the automatic call redirection equipment by addressing a Short Messaging Service (SMS) message to the automatic call redirection equipment. Alternatively, the automatic telephone service forwarding device may communicate with the automatic call redirection equipment by placing a telephone call to the automatic call redirection equipment.

According to another aspect of the invention, the automatic telephone service forwarding device may be integrated into a wireless telephone. In this alternative, the automatic telephone service forwarding device receives the forwarding directory number through keystrokes or voice commands entered into the wireless telephone. In similar fashion, the triggering event may be a keystroke or voice command entered into the wireless telephone. Specifically, the automatic telephone service forwarding device may include a scrollable list of potential forwarding directory numbers programmable into the wireless telephone through keystrokes or voice commands entered into the wireless telephone. The automatic telephone service forwarding device may also include a "forward" button for receiving a command instructing the wireless telephone to automatically transmit the message instructing the telephone redirection device to forward telephone calls placed to the device directory number to a potential forwarding directory number selected from the scrollable list. The automatic telephone service forwarding device may also be configured to automatically select certain potential forwarding directory numbers in accordance with a predefined time-based profile.

The invention also provides a method for automatically forwarding telephone service. This method includes providing an automatic telephone service forwarding device with a forwarding directory number. The device then detects that a data port of the device has become in communication with a data port of a telephone device. In response, the automatic telephone service forwarding device automatically transmits a message instructing a telephone redirection device to forward telephone calls placed to the telephone device's directory number to the forwarding directory number.

The telephone redirection device later detects that the telephone device has entered a reactivated condition. In response, the telephone redirection device unforwards the telephone service for the telephone device. In particular, the telephone redirection device may detect that the telephone device has entered a reactivated condition by receiving an autonomous registration or call origination message from the telephone device. Alternatively, the telephone redirection device may detect that the telephone device has entered a reactivated condition by receiving a predefined unforward message from the telephone device.

That the present invention improves over the drawbacks of the prior art and how it achieves the advantages described above will become apparent from the following detailed description of exemplary embodiments and the appended claims and drawings.

DETAILED DESCRIPTION OF EMBODIMENTS OF THE INVENTION

Figure 1A:
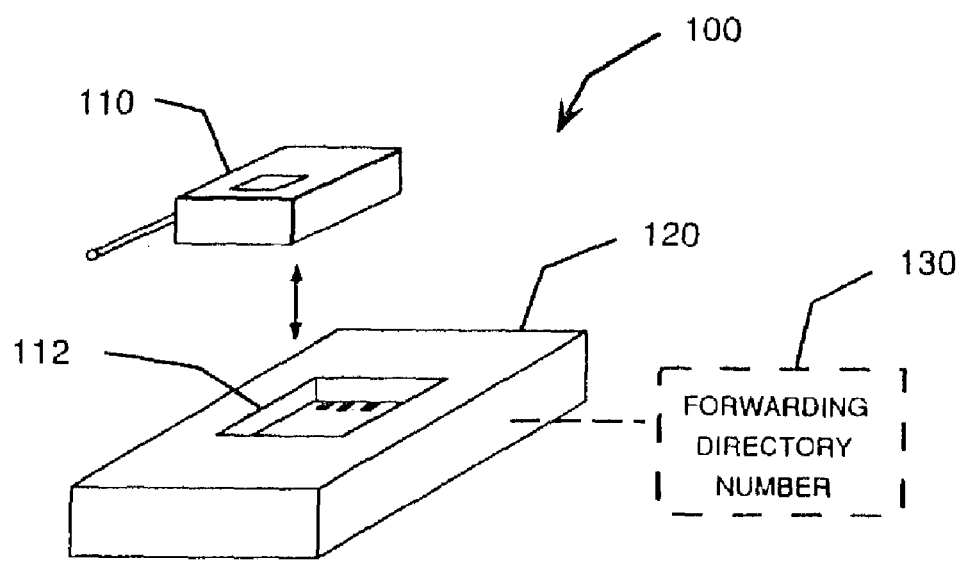
FIGS. 1A and 1B illustrate embodiments of the present invention having a base defining a socket configured for receiving a wireless telephone.

The present invention may be embodied in an automatic telephone service forwarding device (ATF device) that is operable for automatically forwarding telephone service for a telephone device, such as a wireless unit, upon detecting a triggering event. In particular, the ATF device may automatically forward telephone service for a wireless unit to a nearby wireline unit upon detecting receipt of the wireless unit in a socket defined by the ATF device. For example, the device may be embodied in a stand-alone, unpowered ATF device including a base or enclosure defining a socket configured to receive a wireless unit. Upon detecting the presence of a wireless unit in the socket, the ATF device automatically forwards telephone service for the wireless unit to a forwarding directory number that was previously programmed into the ATF device, such as the directory number for a nearby wireline telephone. In this unpowered configuration, the ATF device draws power from the wireless unit, and automatically activates when the wireless unit is placed in the socket.

Once the ATF device successfully transmits telephone service redirection instructions to forward telephone service for the wireless unit, the ATF device causes the wireless unit to power down to conserve its battery and to prevent the wireless unit from transmitting a subsequent autonomous registration message that might cause the host telephone network to unforward the telephone service for the wireless unit. When the wireless unit again powers up, the wireless unit transmits an autonomous registration or call origination message, which the host telephone network interprets as an unforward command. In response, the host telephone network automatically unforwards telephone service for the wireless unit.

In other words, the host telephone network may automatically interpret a subsequent autonomous registration or call origination message transmitted by the wireless unit as an unforwarding command. Alternatively, the wireless unit may be configured to automatically transmit an unforwarding command upon powering up. As another alternative, a self-contained ATF device may be configured to transmit an unforwarding command upon detecting removal of the wireless unit from the socket, although this alternative may require a separate power source for the ATF device. Other alternatives for signaling the host telephone system to unforward telephone service for the wireless unit will be apparent to those skilled in the art (e.g., including an "unforward" button on the wireless unit, or including an "unforward" button on the self-contained ATF device, and so forth).

The stand-alone, unpowered ATF device described above may be deployed in a number of configurations, such as a premises-type configuration in which the wireless unit stands up in the socket. Alternatively, in an automobile-type configuration, the wireless unit may lie on its side or back in the socket. In other configurations, the socket may be replaced by a wired jack that inserts into a terminal on the wireless unit, or the socket may be replaced by a wireless data link, such as an infra-red or radio-frequency link, and so forth. For example, an infra-red or radio-frequency link may provide a universal link to a variety of wireless units with differing case configurations, whereas a socket-type configuration may be suitable for only a subset of wireless units with similar case configurations and data contact positions. For this reason, a socket-type configuration may include an auxiliary wired jack for communicating with wireless units having dissimilar case configurations or data contact positions.

Although the invention may be embodied in a stand-alone, unpowered ATF device as described above, the ATF device may also be embodied in other configurations. For example, the ATF device may be incorporated into a battery charging base station for the wireless unit. Alternatively, the ATF device may be built into a home-based communication center, or built into another device such as a personal computer. In addition, the ATF device may be incorporated into the wireless telephone itself. In this case, the ATF device typically includes a "forward" button and a scrollable list of the forwarding directory numbers that may be programmed into the wireless telephone. The automatic telephone service forwarding device may also include a programmable data structure that allows the device to be configured to automatically select certain potential forwarding directory numbers in accordance with a predefined time-based profile.

In various embodiments, the ATF device may be configured to operate with wireless telephones, pagers and other types of telephone devices, such as computers or other devices containing telephone equipment. In addition, the ATF device may be configured to operate with wireless units that are located in their home areas or when roaming, and may be configured to operate in local number portability (LNP) enabled and non-enabled networks. Those skilled in the art will also appreciate that the present invention could be configured to forward messages other than telephone calls and paging communications, such as e-mail and other types of addressed messages that use the telephone infrastructure as a communication medium. Thus, the ATF device may be used to forward messages directed to a wide variety of devices that include telephone equipment (referred to collectively as "telephone devices"), such as wireless telephones, pagers, and various types of computers configured to receive telephone calls, paging messages, e-mail, and the like.

The base of the ATF device may also be configured with multiple sockets for receiving multiple telephone device. For example, a conference room-type configuration may include eight slots for receiving eight wireless units while a meeting is in progress. In this manner, telephone calls directed to up to eight of the meeting participants may be forwarded to a landline telephone attended by a receptionist. For this configuration, each socket of the ATF device includes a data port that comes into communication with a data port on a wireless unit when the wireless unit is placed in the socket. As in a single-unit configuration, each data port in a multi-unit configuration may be a touch-pin connector positioned to come into contact with a touch-pin connector on the wireless unit when the wireless unit is placed in the socket. Alternatively, the data port may be a male/female jack, an infra-red link, a radio-frequency communication link, or another type of suitable data port.

The ATF device may typically be programmed with a forwarding directory number by placing a wireless unit in the socket and programming the ATF device by entering keystroke commands or voice commands into the wireless unit. That is, a wireless unit placed in the socket may be used to program the ATF device using a predefined command syntax that the ATF device is configured to respond to. Alternatively, the ATF device itself may include a keypad, voice recognition equipment, a data jack for connecting to a personal computer, or some other type of programming device that does not rely on a wireless unit. For example, the ATF device may include a telephone-style keypad for entering data into the ATF device, a display device for displaying a selected forwarding directory number, and a memory for storing a scrollable list of selectable forwarding directory numbers. This alternative may require a separate power source for the ATF to enable the programming equipment to operate when a wireless unit is not located in the socket of the ATF device. This option may be preferred for some users, however, because it does not require a wireless unit to program the ATF device.

The ATF device typically transmits telephone service forwarding instructions by way of a wireless unit placed in the socket. For example, the ATF device may cause a wireless unit placed in the socket to transmit a Short Messaging Service (SMS) message addressed to an automatic call redirection equipment (ACRE) platform on the overhead data channel normally used by the wireless unit. The ACRE platform then implements the forwarding function by emulating a Visitor Location Register (VLR) for an MTSO where the wireless unit is registering for roaming service. This alternative may be suitable for use with certain digital wireless units, such as IS-136 digital wireless telephones. Alternatively, the ATF device may cause the wireless unit to place a telephone call to a predefined directory number assigned to the ACRE platform that is configured to receive telephone service redirection instructions. For this alternative, the ACRE platform also implements the forwarding function by emulating a VLR for an MTSO where the wireless unit is registering for roaming service. This alternative may be suitable for analog cellular telephones and with certain digital wireless units, such as IS-136 digital wireless telephones.

In addition to the alternatives described above, the ATF device itself may include paging and/or telephone equipment, and it may be configured to transmit telephone service redirection instructions without use of the wireless unit. For example, the ATF device may include SMS circuitry similar to that in an IS-136 digital wireless telephone. Alternatively, the ATF device may include a modem and automatic dialing circuitry configured to place a telephone service redirection telephone call to the ACRE. This option may be preferred in some situations because it avoids the need for circuitry in the ATF device capable of causing the wireless unit to transmit SMS messages or place telephone calls, which may be complicated or expensive to implement on a universal basis.

Those skilled in the art will recognize that the telephone system may provide a number of different methods for implementing telephone service forwarding in response to telephone service redirection instructions received from the ATF device. For example, as another alternative to the procedures described above in which an ACRE platform implements the telephone service forwarding feature by emulating a VLR, the ATF device may cause the wireless unit (e.g., an IS-136 TDMA wireless telephone) to automatically transmit an IS-136 message including predefined forwarding code, such as "*71+ forwarding directory number." For this alternative, the home MTSO is configured to recognize the forwarding code and implement the forwarding function without participation by the ACRE platform or any other device. This approach may have a drawback, however, in that this type of "*71" forwarding typically requires manual unforwarding. The ACRE platform call forwarding calls are "automatically" unforwarded.

In addition, the Advanced Intelligent Network (AIN) operated by many telephone service providers utilizes a signaling network known as "SS7" to implement a wide variety of telephone service functions. Through the SS7 signaling network, the forwarding directory number for a wireless unit may be entered into any of a wide variety of telephone redirection devices in the AIN, such as the ACRE platform described above, a Home Location Register (HLR) maintained at the wireless unit's home Mobile Telephone Switching Office (MTSO), an Visitor Location Register (VLR) maintained at an MTSO where the wireless unit is registered for service, a Local Number Portability Platform (LNPP), a land-based switch servicing the wireless unit's MTSO, a specialized "sniffer" platform configured to intercept and apply special handling to telephone redirection instructions, or any other platform in the AIN (or another type of intelligent telephone network) that may be used to implement telephone service forwarding. It should be understood, therefore, that the present invention is not limited to any particular method for implementing telephone service forwarding once the telephone service redirection instructions have been transmitted to the host telephone system.

Figure 1B:
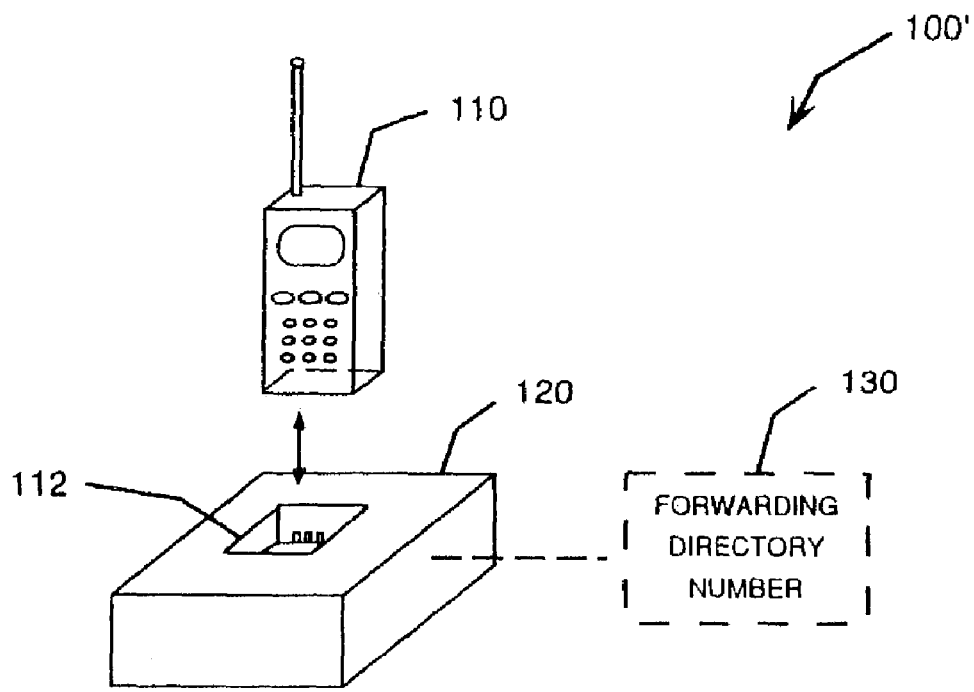

Referring now to the drawings, in which like numerals indicate like elements throughout the several views, FIGS. 1A and 1B illustrate alternative case configurations for the ATF device 100. FIG. 1A illustrates an automobile-type case configuration, in which a wireless unit 110 lies on its back in a socket 112 defined by the base 120 of the ATF device. This lying-down case configuration is considered suitable for a relatively unstable environment, such as an automobile, to minimize the likelihood of the wireless unit 110 accidentally falling out of the socket 112.

The ATF device 100 in this configuration may be a stand-alone, unpowered device. When the wireless unit 110 is located in the socket 112, the wireless unit 110 may be used to enter a forwarding directory number 130 into the ATF device 100. For example, the directory number of a wireless unit mounted in the host vehicle would typically be the forwarding directory number 130 entered into this type of ATF device. When the wireless unit 110 is subsequently placed in the socket 112, the ATF device 100 automatically forwards telephone service for the wireless unit 110 to the forwarding directory number 130. That is, the ATF device 100 detects the presence of the wireless unit 110 in the socket 112 as a triggering event that causes the ATF device 100 to automatically forward telephone service for the wireless unit 110. To do so, the ATF device 100 reads the device directory number from the wireless unit 110 and constructs a Short Messaging System (SMS) forwarding message including the device directory number, the forwarding directory number, and telephone service redirection instructions. The ATF device 100 then causes the wireless unit 110 to transmit the SMS forwarding message to a host Mobile Telephone Switching Office (MTSO) on the overhead data channel implemented by the MTSO.

The ATF device 100 may be useful for a subscriber who has specialized telephone equipment installed in his or her automobile, such as a headset or hands-free microphone for use with an automobile-based wireless unit. If this subscriber also has a pocket-type wireless unit 110, the subscriber may prefer to receive all telephone calls while driving on the automobile-based unit. The ATF device 100 allows the subscriber to automatically forward telephone calls directed to the pocket-type unit 110 to the automobile-based unit by simply placing the pocket-type unit 110 in the socket 112 of the ATF device 100.

FIG. 1B a premises-type ATF device 100' that is similar to the automobile-type ATF device 100, except that the case is different in that the wireless unit 100 stands up in the socket 112. For this stand-up alternative, the directory number of a wireline telephone located nearby would typically be the forwarding directory number 130 entered into the ATF device 100'. Although this case configuration is considered more suitable in the highly stable environment of a home or office, either type of ATF device 100, 100' could be placed in a home or office, or in a vehicle.

Figure 2:
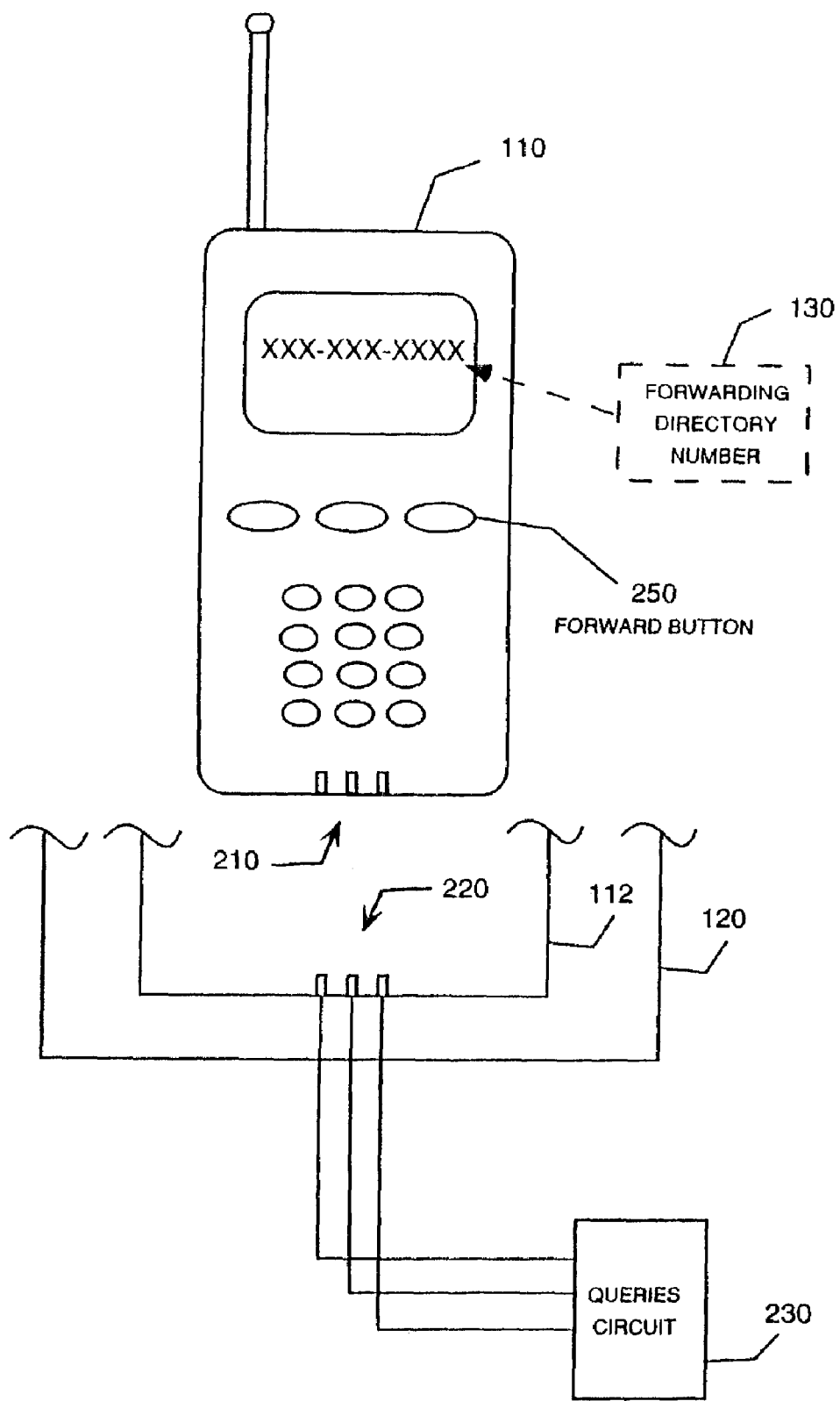
FIG. 2 illustrates the functional connection between the socket and wireless telephone illustrated in FIGS. 1A and 1B.

FIG. 2 illustrates the functional connection between the socket 112 and the wireless telephone 110 illustrated in FIGS. 1A and 1B. Specifically, the wireless telephone 110 includes a touch-pin contact 210 that becomes functionally connected with a touch-pin contact 220 of the ATF device 100 when the wireless telephone 110 is positioned in the socket 112 of the ATF device 100. As noted above, the ATF device 100 interprets the detection of the touch-pin contact 220 becoming in communication with the touch-pin contact 210 as a triggering event that causes the ATF device 100 to automatically implement call forwarding for the wireless telephone 110.

More specifically, upon contact the ATF device 100 retrieves the forwarding directory number 130 and reads the device directory number from the wireless telephone 110. The ATF device 100 then constructs an SMS forwarding message including the device directory number, the forwarding directory number, and telephone service redirection instructions. The ATF device 100 then causes the wireless unit 110 to transmit the SMS forwarding message to the host MTSO on the overhead data channel implemented by the host wireless network. The ATF device 100 then causes the wireless unit 110 to power down.

To accommodate this functionality, the data contacts 210, 220 include at least one universal bi-directional data contact that may be used for uploading and downloading information. For example, the contacts 210, 220 may include two contacts for charging the battery within the wireless unit 110, and a third bi-directional data pin. This data pin uploads and downloads data, such as the forwarding number 130, the device directory number, and the SMS forwarding message between the ATF device 100 and the wireless unit 110.

The contacts 210 of the ATF device 100 functionally connect with contacts 220 wireless unit 110 with a processor 230 located within the ATF device 100. For example, the processor 230 may be a queries circuit with components known in the industry, such as a microprocessor manufactured by Microchip Technology, Inc. sold under the trade designation PIC12c509, with an E2PROM also manufactured by Microchip Technology, Inc sold under the trade designation 24LC08. The manner in which the processor 230 operates is described below with reference to FIG. 7. The ATF device 100 also contains a memory storage device that is functionally connected to the processor 230. The memory storage device stores the operating algorithm for the ATF device 100, and also stores the forwarding directory number after completing the setup task, which is described below with reference to FIG. 6.

FIG. 2 also illustrates an alternative embodiment, in which the ATF device 100 is incorporated into the wireless telephone 110. In this embodiment, the wireless telephone 110 includes a "forward" button 250 and a scrollable list of potential forwarding directory numbers stored in memory. In this embodiment, the triggering event is selection or pressing of the "forward" button 250, which causes the wireless telephone 110 to automatically forward service for the wireless unit to a forwarding directory number selected from the list. That is, the ATF device 100 is integrated into the wireless telephone 110, and the wireless telephone receives the forwarding directory number through keystrokes or voice commands entered into the wireless unit. Therefore, a stand-alone base 120 is not required for this alternative. Certain programming aspects of the operation of this alternative are described below with reference to FIG. 9.

Figure 3:
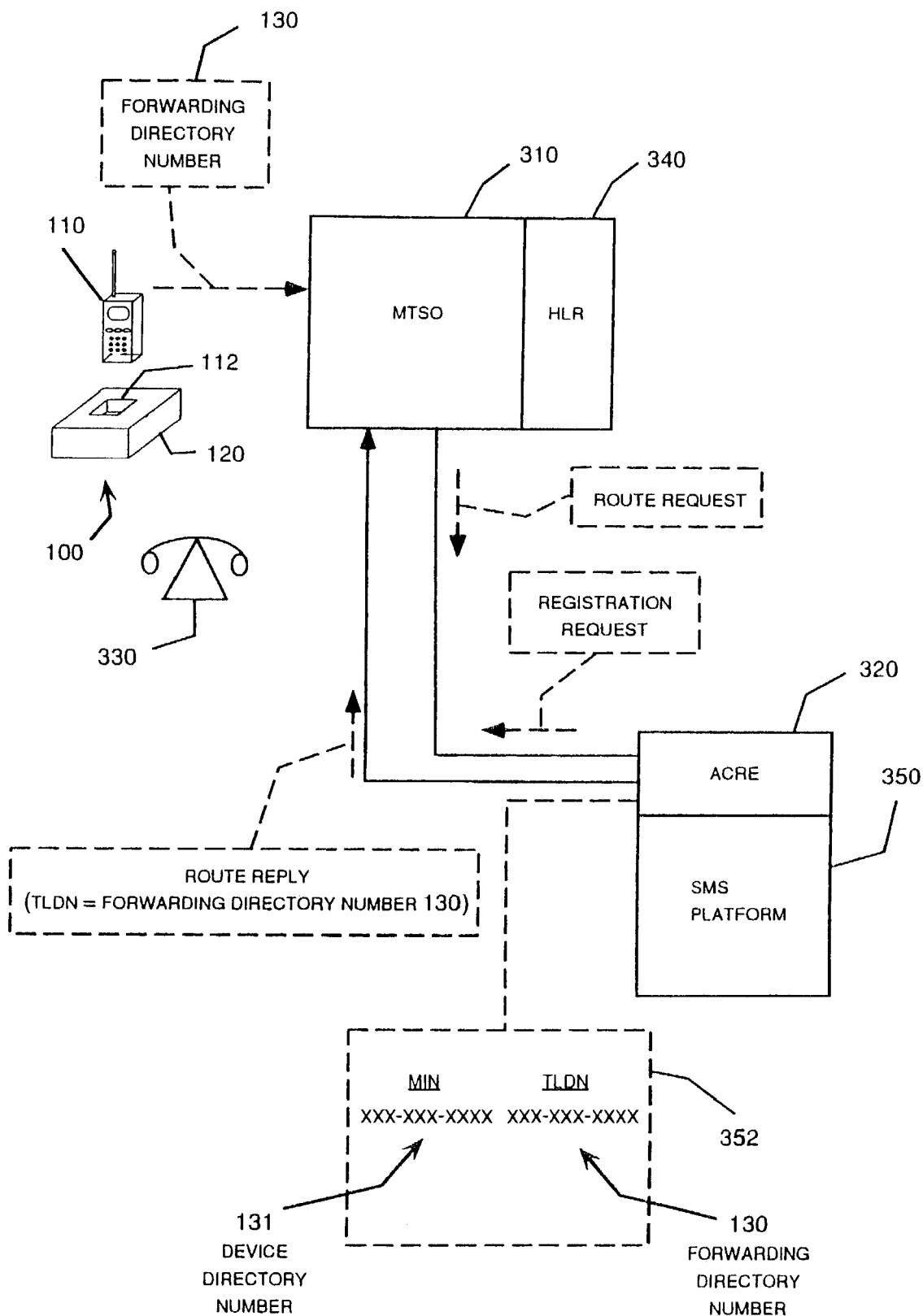
FIG. 3 illustrates the operation of an automatic telephone service forwarding device utilizing a Short Messaging Service to transmit telephone service forwarding instructions to a home Mobile Telephone Switching Office.

FIG. 3 illustrates the operation of an ATF device 100 utilizing an SMS message to transmit telephone service forwarding instructions to a home MTSO 310. The home MTSO 310 works in concert with an ACRE platform 320 that enters telephone call redirection instructions into the HLR 340 of the home MTSO 310 by emulating a VLR. In other words, the ACRE platform 320 acts as if it is an MTSO in which the wireless unit 110 is registered for roaming service. This allows the ACRE platform 320 to use the roaming functionality of the wireless network to implement telephone service forwarding for the wireless unit 110.

Specifically, the ATF device 100 is preprogrammed with a forwarding directory number 130, such as the directory number assigned to a nearby wireline telephone 330. When the ATF device 100 detects the presence of the wireless unit 110 in the socket 112, the ATF device 100 causes the wireless unit 110 to transmit an SMS forwarding message on the overhead data channel. This forwarding message includes the device directory number 131 read from the wireless unit 110, the forwarding directory number 130 retrieved from memory, and forwarding instructions addressed to the ACRE platform 320. The ACRE platform 320 typically maintains a database 352 in which it stores and correlates the device directory number 131 with the forwarding directory number 130. The MTSO 310 initially receives the SMS forwarding message and relays it to the ACRE platform 320 in accordance with the address information placed in the SMS forwarding message by the ATF device 100.

The ACRE platform 320 may be a separate device as in conventional configurations, or it may be integrated into an MTSO or HLR, or it may be integrated into an SMS platform configured for implementing a number of SMS-related services in response to SMS messages, as shown in FIG. 3. If the ACRE platform 320 is separate from the MTSO nearest to the ATF device 100, that MTSO initially receives the SMS forwarding message and sends it to the appropriate ACRE platform 320 in accordance with the address information included in the SMS message. In the alternative illustrated in the FIG. 3, the MTSO nearest to the ATF platform 100 is the home MTSO 310 for the wireless unit 110, which maintains a record for the wireless unit 110 in an associated HLR 340. The ACRE platform 320, in turn, is configured to recognize the SMS forwarding message and implement the telephone service redirection function.

To implement the telephone service redirection function, the ACRE platform 320 emulates a VLR by sending a registration message to the home MTSO 310. This type of registration message is normally used by an MTSO attempting to register the wireless unit 110 for roaming service. The home MTSO 310 also sets a flag indicating that the ACRE platform 320 should be consulted for routing instructions for each incoming telephone call directed to the wireless unit 110, just as if the wireless unit 110 had registered for roaming service. This flag, which remains set until the telephone service for the wireless unit 110 is subsequently unforwarded, instructs the MTSO 310 to consult with the ACRE platform 320 for future telephone calls directed to the wireless unit 110. Thus, for each incoming telephone call directed to the wireless unit while the flag is set, the MTSO 310 sends a route request message to the ACRE platform 320. The ACRE platform responds with a route reply message having the forwarding directory number 130 in the TLND field. This route reply message causes the MTSO 310 to route the incoming call to the forwarding directory number 130. This approach to implementing the forwarding function has the advantage of using the functionality already enabled in the MTSO for roaming to implement the forwarding functionality. In addition, the ACRE platform 320 is also an existing device that can be easily modified to implement the functionality described above. When a call home comes in to the MTSO 310, the MTSO 310 sends a route request message to the ACRE platform 320, as if the ACRE platform 320 is an MTSO. The ACRE platform 320 would normally respond to the route request message with a route reply message assigning a temporary line directory number (TLDN) that the home MTSO 310 would then use to route an incoming telephone call to the MTSO where the wireless unit 110 is roaming.

To implement the telephone service forwarding function for the wireless unit 110, however, the ACRE platform 320 inserts the forwarding directory number 130 in the TLDN field of the route reply message. When a call comes in, the home MTSO 310 therefore responds by forwarding the telephone call to the directory number in the TLDN field of the route reply message, in this case the forwarding directory number 130.

FIG. 3 also illustrates a modification to the approach described above, in which the ACRE platform 320 is one of a group of services implemented by a SMS platform 350. In this alternative, the ACRE platform 320 also implements call forwarding by emulating a VLR, and the home MTSO 310 actually performs the telephone call redirection function for incoming telephone calls by asking the ACRE platform 320 for routing instructions as if the ACRE platform 320 is an MTSO with which the wireless unit 100 is registered for roaming service. Alternatively, in an LNP-enabled network, the ACRE platform 320 may enter the redirection instructions into an LNPP database. The ACRE platform 320 may also be configured to transmit the redirection instructions to any other device in the telephone network that is configured to perform the telephone service redirection function.

Figure 4:
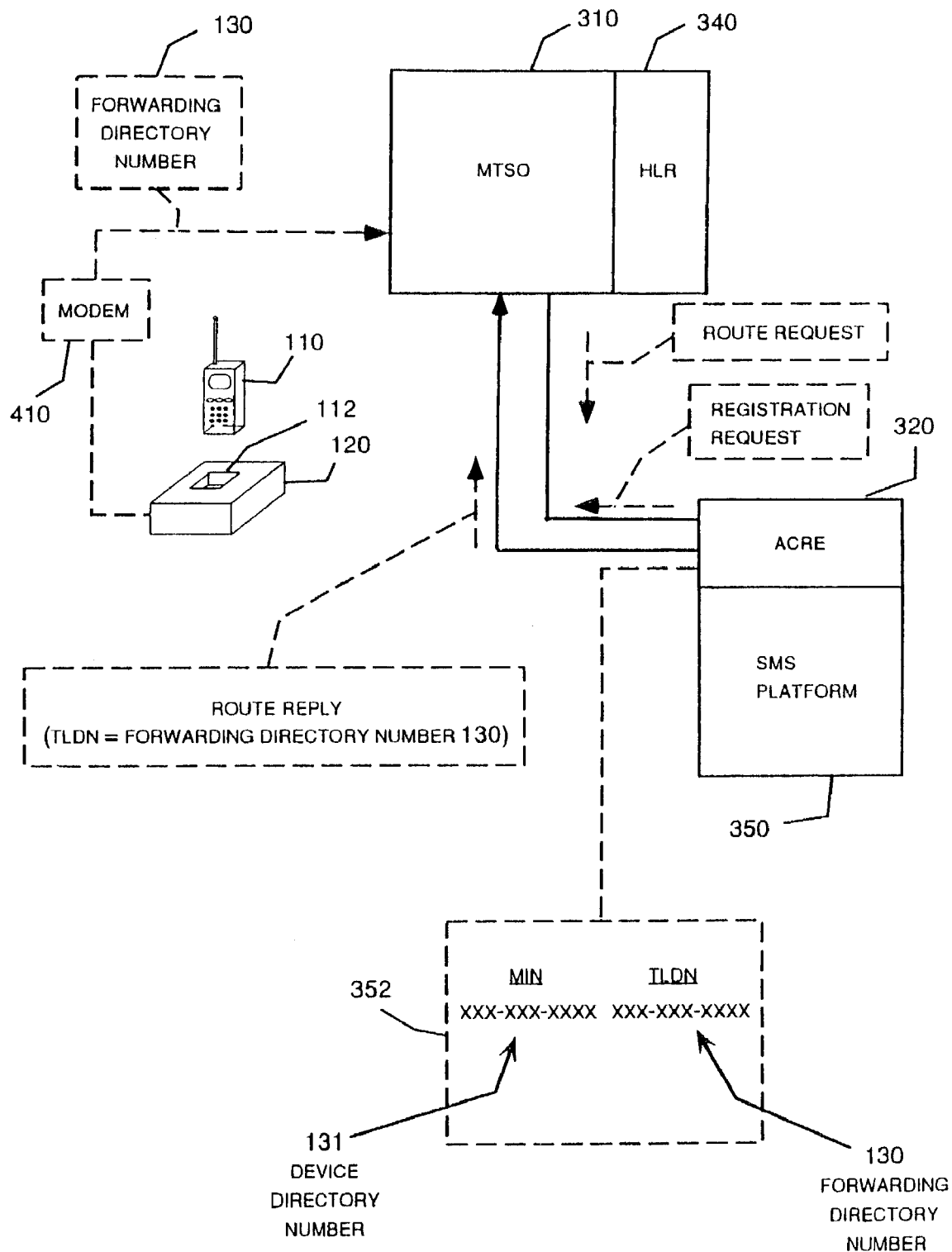
FIG. 4 illustrates the operation of an automatic telephone service forwarding device utilizing a modem to place a telephone call to transmit telephone service forwarding instructions to a home Mobile Telephone Switching Office.

FIG. 4 illustrates an alternative that is similar to that described with reference to FIG. 3, except that the ATF device 100 communicates the forwarding message to the ACRE platform 320 by placing a telephone call rather than transmitting an SMS message. In this alternative, the self-contained ATF device 100 includes a modem 410 and telephone dialing circuitry that enables the ATF device to place a telephone call to the ACRE platform 320. Again, the ACRE platform 320 implements call forwarding by emulating a VLR, and the home MTSO 310 for the wireless unit actually performs the telephone call redirection function for each incoming telephone call by asking the ACRE platform 320 for routing instructions. Alternatively, the ACRE platform 320 may enter the redirection instructions into an LNPP database or another network element configured to implement the redirection function.

Figure 5:
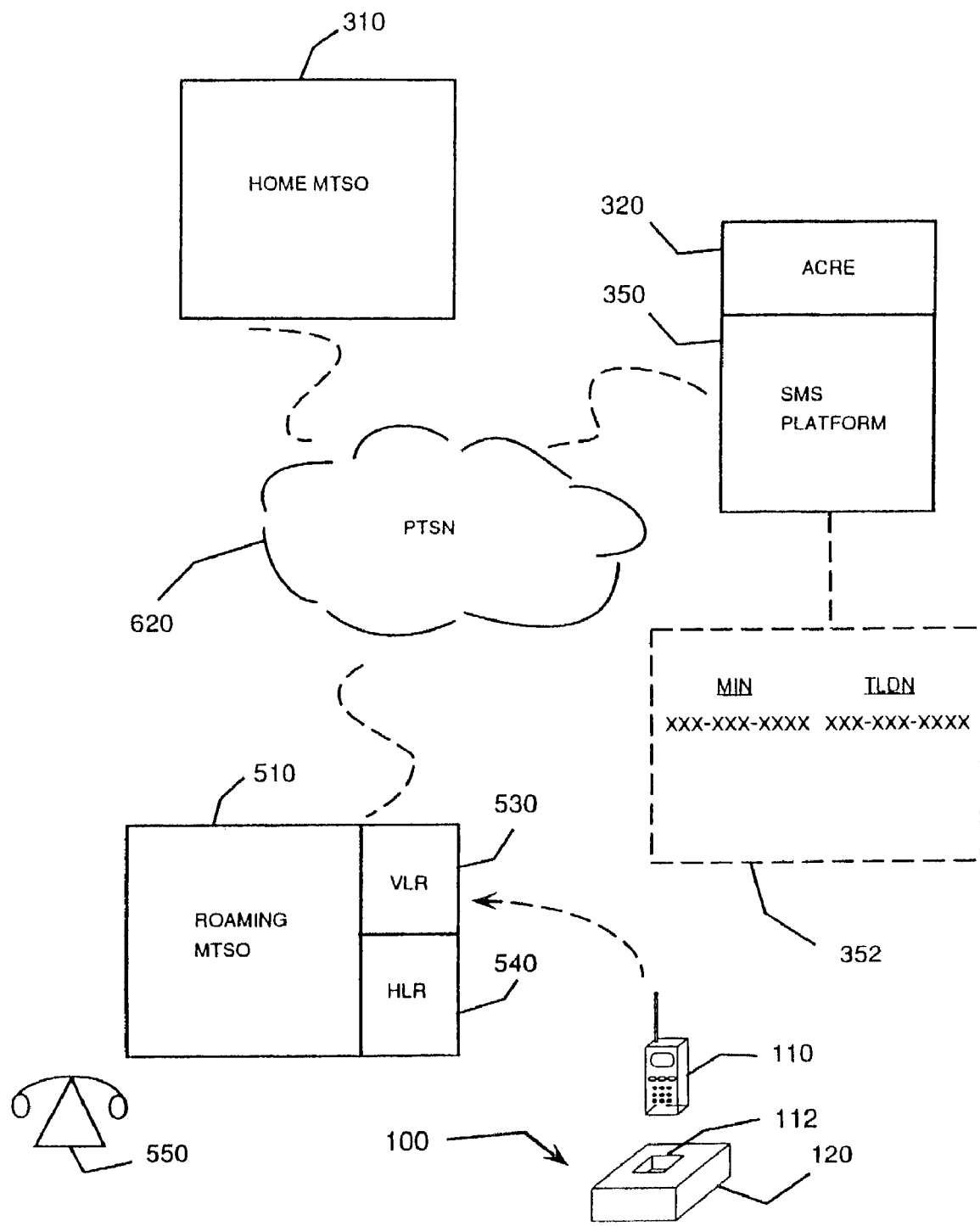
FIG. 5 illustrates the operation of an automatic telephone service forwarding device in connection with a roaming wireless unit.

FIG. 5 illustrates the operation of the ATF device 100 in connection with a roaming wireless unit 110. This alternative is similar to the approach described with reference to FIG. 3, except that the roaming MTSO 510 (i.e., the MTSO with which the wireless unit 110 is attempting to register for roaming service) relays the SMS forwarding message to the home MTSO 310, which in turn relays the SMS forwarding message to the ACRE platform 320. In this example, the forwarding directory number 130 is the directory number of a wireline unit 550 nearby the roaming wireless unit 110. The home MTSO 310 sets a flag indicating that the home MTSO 310 should consult the ACRE platform 320 (rather than the roaming MTSO 510) for routing instructions for subsequent incoming telephone calls to the wireless unit 110. The ACRE platform 320 then enters the directory number for the wireline unit 550 into the TLDN field of subsequent route reply messages sent to the home MTSO 310.

Alternatively, the roaming MTSO 510 may be configured to recognize the SMS forwarding message and, in response, to enter the forwarding directory number 550 into the TLDN field of the route reply message. In either case, the directory number 550 ends up in the TLDN field of the route reply message, and the home MTSO 310 is instructed to consult with a device (e.g., the ACRE 320 or the roaming MTSO 510) that is configured to insert the forwarding directory number 130 into the TLDN field of the route reply message. The home MTSO 310 then processes the route reply message in the usual manner, as if the wireless device 110 is roaming.

FIGS. 6–8 and 10 are logic flow diagrams illustrating the operation of an illustrative embodiment of the invention. To facilitate the description of this embodiment, the element numerals shown in FIG. 3 will also be referred to. In this example, the ATF device 100 is a stand-alone, unpowered device with a touch-pin connector positioned to contact a touch-pin connector on the wireless unit 110 when the wireless unit is received in a socked defined by the ATF device 100. Also in this example, it is assumed that the wireless unit 110 is located in the service area of its home MTSO 310, and that the ATF device 100 causes the wireless unit 110 to transmit SMS forwarding messages addressed to the ACRE platform 320, which implements the forwarding feature by emulating a VLR. From this example, those skilled in the art will understand the modifications required to implement the other alternative embodiments of the invention described above.

Figure 6:
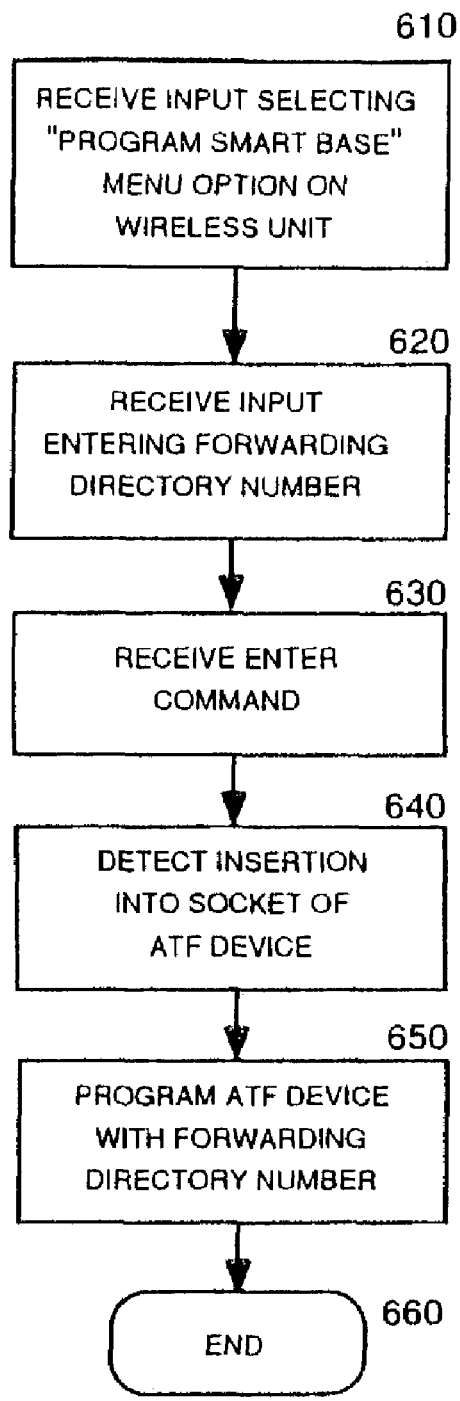
FIG. 6 is a logic flow diagram illustrating a method for programming an automatic telephone service forwarding device with a forwarding directory number.

FIG. 6 is logic flow diagram illustrating a routine 600 implemented by the wireless device 110 when programming the ATF device 100 with the forwarding directory number 130. In step 610, the user selects a predefined menu option, such as a "PROGRAM SMART BASE" menu option, on the wireless device 110. Step 610 is followed by step 620, in which the user enters the forwarding directory number 130 using keystrokes or voice commands recognized by the wireless device 110. Step 620 is followed by step 630, in which the user enters a save command, for instance by depressing an "enter" key on the wireless device 110.

Step 630 is followed by step 640, in which the user places the wireless device 110 in the socket 112 of the ATF device 100, and the wireless device 110 detects that it has been placed in the socket 112 of the ATF device 100. Specifically, the wireless device 110 typically detects that the data pin of the contact 210 on the wireless unit 110 has come in contact with the data pin of the contact 220 on the ATF device 100 by sensing a drop in the voltage of the data pin of the contact 210 that occurs when that pin contacts the data pin of the contact 220. Step 640 is followed by step 650, in which, upon detecting the functional contact between the data contacts 210, 220, the wireless device 110 downloads the forwarding directory number 130 to the ATF device 100. Step 650 is followed by the "END" step 660, which concludes routine 600.

Figure 7:
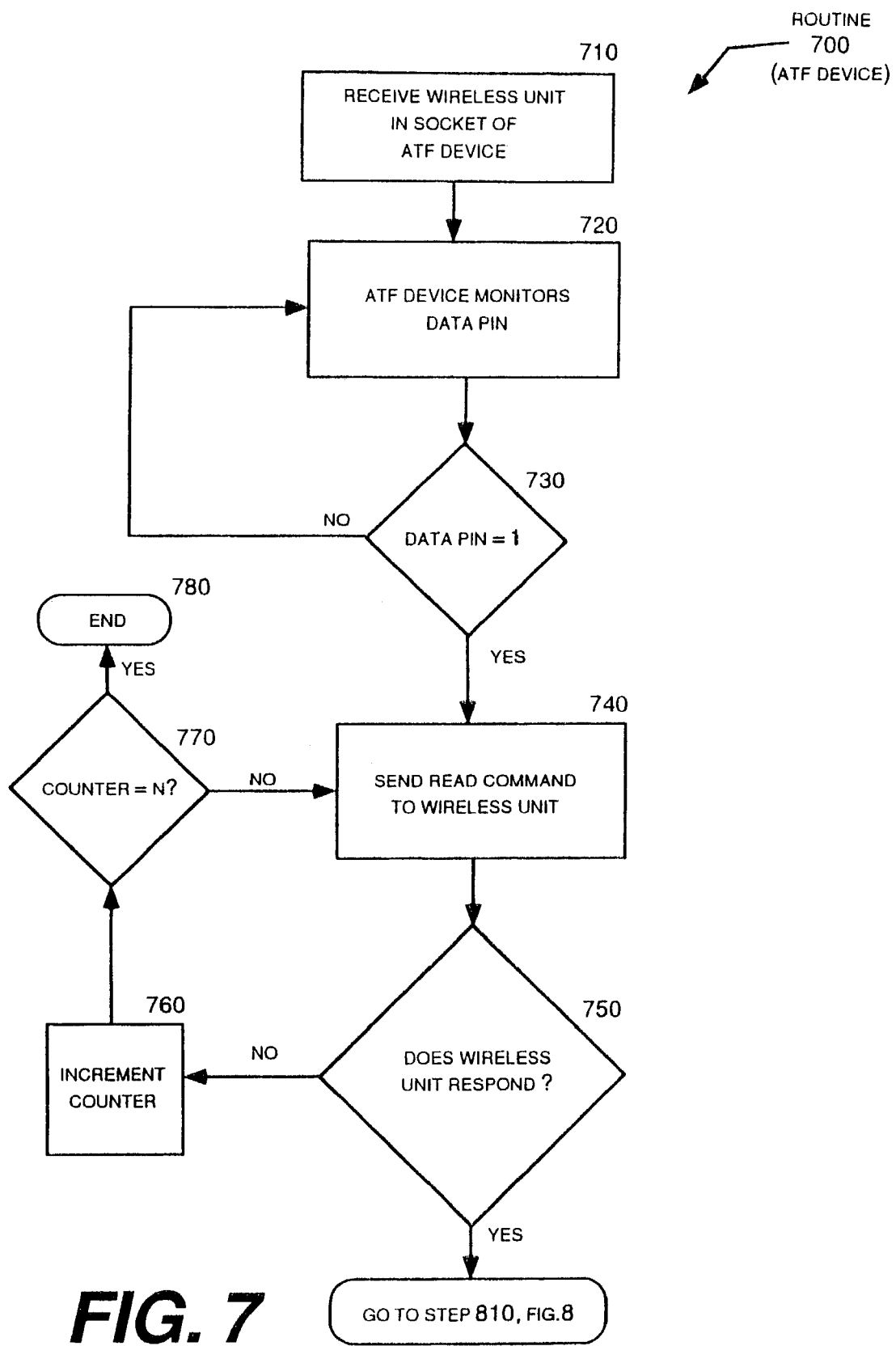
FIG. 7 is a logic flow diagram illustrating a method implemented by an automatic telephone service forwarding device to automatically forward telephone service.

FIG. 7 is logic flow diagram illustrating a routine 700 implemented by the ATF device 100 to automatically forwarding telephone service for the wireless unit 110. Routine 700 begins in step 710, in which the subscriber places the wireless unit 110 into the socket 112 of the ATF device 100. In this example, the ATF device 100 has been previously programmed with the forwarding directory number 130, as described above with reference to FIG. 6. Step 710 is followed by step 720, in which the ATF device 100 monitors the status of the data pin of the touch-pin contact 220.

Specifically, no voltage on the data pin of the touch-pin contact 220 is considered a logic "0" indicating that a wireless unit 110 is not located in the socket 112 of the ATF device 100. Conversely, the presence of voltage on the data pin of the touch-pin contact 220 is considered a logic "1" indicating that a wireless unit 110 is located in the socket 112 of the ATF device 100. In other words, placing the wireless unit 110 in the socket 112 of the ATF device 100 places the data pin of the touch-pin contact 220 on the ATF device in functional contact with the data pin of the touch-pin contact 210 on wireless unit 110. This functional contact of the touch-pin contacts 210, 220 supplies voltage to the touch-pin contact 220 on the ATF device 100, which the ATF device detects as a logic "1." The ATF device 100 interprets this transition to this logic "1" state as a triggering event causing the ATF device to automatically forward telephone service for the wireless unit 110.

This triggering event is represented by step 730, in which the ATF device 100 determines whether the data pin of the touch-pin contact 210 has transitioned to logic "1" state. If the data pin of the touch-pin contact 210 has not transitioned to logic "1" state, the "NO" branch loops back to step 720, in which the ATF device 100 continues to monitor the status of the data pin. If the data pin of the touch-pin contact 210 has transitioned to logic "1" state, the "YES" branch is followed to step 740, in which the ATF device 100 sends a predefined read command to the wireless unit 110. The purpose of this read command is to obtain the device directory number for the wireless unit 110, which can be read from a memory device internal to the wireless unit 110.

Step 740 is followed by step 750, in which the ATF device 100 determines whether the wireless unit 110 responds to the read command. If the wireless unit 110 responds to the read command, the "YES" branch is followed to step 810, which is shown on FIG. 8. If the wireless unit 110 does not respond to the read command, the "NO" branch is followed to step 760, in which the ATF device 100 increments a counter, which has an initial value of zero. Step 760 is followed by step 770, in which the ATF device 100 determines whether the value of the counter is equal to a predetermined threshold value "N." If the value of the counter is not equal to the predetermined threshold value "N," the "NO" branch is followed to step 740, in which the ATF device 100 sends another read command to the wireless unit 110. If the value of the counter is equal to the predetermined threshold value "N," the "YES" branch is followed to the "END" step 780, which ends routine 700. Thus, the ATF device 100 will make up to "N" attempts to read a device directory number from the wireless unit 110. The multiple read commands give the wireless unit 110 an opportunity to power on in response to the first read command, if necessary.

Figure 8:
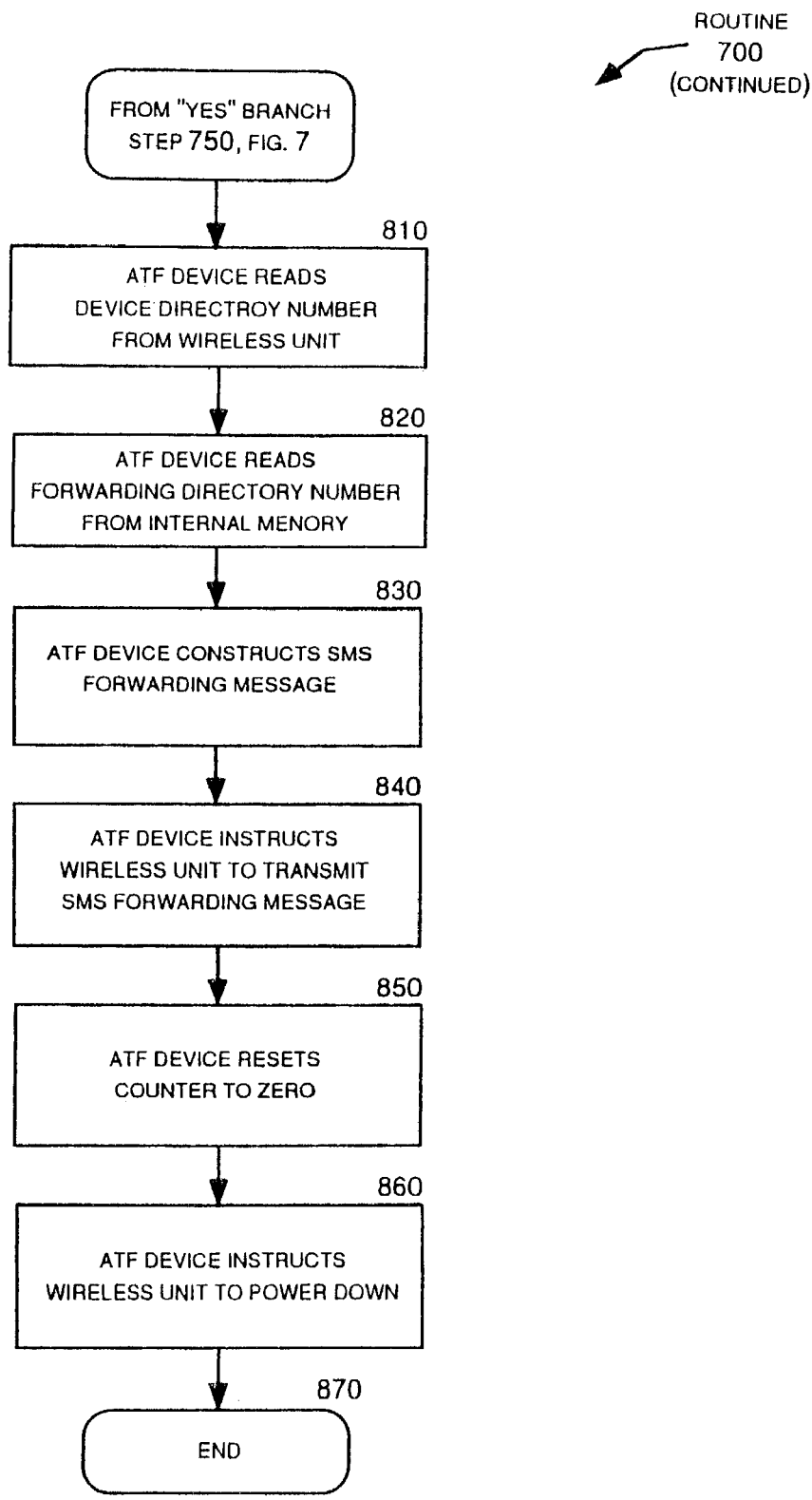
FIG. 8 is a continuation of the logic flow diagram illustrated in FIG. 7.

FIG. 8 is a continuation of routine 700 illustrated in FIG. 7. Referring again to step 750, if the wireless unit 100 responds to the read command, the "YES" branch is followed to step 810, the wireless unit 100 supplies the ATF device 100 with the device directory number for the wireless unit 110. Stated differently, the ATF device 100 reads the device directory number for the wireless unit 100. Step 810 is followed by step 820, in which the ATF device 100 reads the forwarding directory number from its internal memory. Step 820 is followed by step 830, in which the ATF device 100 constructs an SMS forwarding message including the device directory number, the forwarding directory number, and a redirection instruction. This redirection instruction, which may be a predefined address or forwarding code included in the SMS forwarding message, is addressed to the ACRE platform 320 in a manner recognizable by the home MTSO 310.

Step 830 is followed by step 840, in which the ATF device 100 instructs the wireless unit 110 to transmit the SMS forwarding message to the host MTSO 310, which relays the SMS forwarding message to the ACRE platform 320. Step 840 is followed by step 850, in which the ATF device 100 resets the counter to zero. Step 850 is followed by step 860, in which the ATF device 100 instructs the wireless unit 110 to power down. Step 860 is followed by the "END" step 870, which concludes routine 700. Thus, the ATF device 100 automatically causes the wireless unit 110 to transmit the SMS forwarding message upon detecting that the data pin of the ATF device 100 has become in communication with the data pin of the wireless unit 110.

Figure 9:
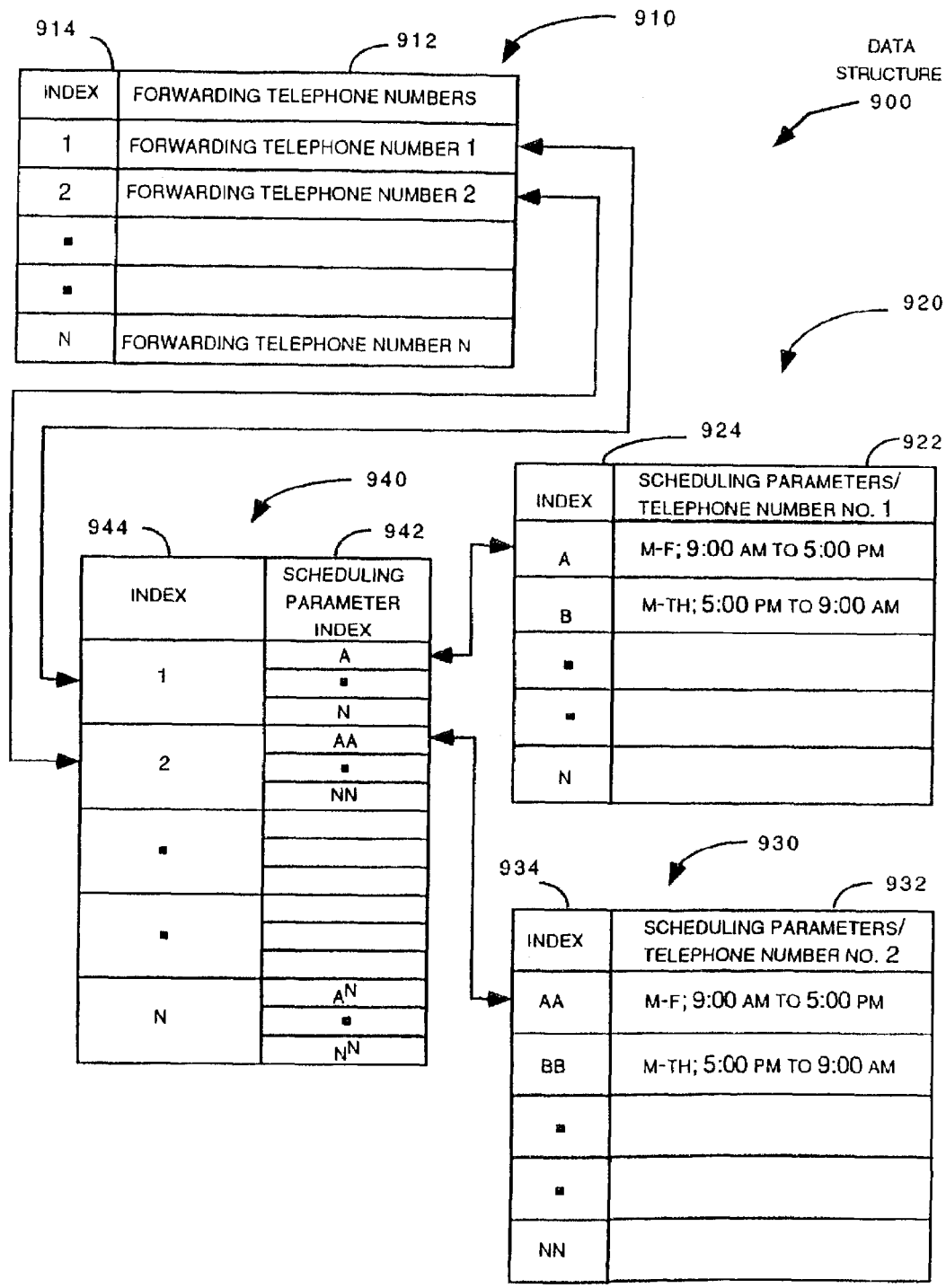
FIG. 9 illustrates a data structure containing a scrollable list of forwarding directory numbers for an automatic telephone service forwarding device incorporated into a wireless telephone.

FIG. 9 illustrates a data structure 900 containing a scrollable table of forwarding directory numbers for an ATF device 100 incorporated into a wireless telephone. To facilitate use of the automatic forwarding feature of the wireless unit 110, the unit may be programmed to automatically change the selected forwarding directory number in accordance with a predetermined schedule. These automatically selected forwarding directory numbers are made current or focused for immediate selection by pressing the "forward" button. In this manner, the wireless unit 110 may be programmed to be "ready" with selected forwarding directory numbers based on the schedule programmed into the wireless unit by the user.

More specifically, the functionality of the data structure 900 allows the subscriber to create a time and date-based forwarding profile for determining the selected forwarding directory number. For example, the subscriber can program the ATF device 100 to maintain an office wireline directory number as the selected forwarding directory number during normal working hours, and maintain a home wireline directory number as the selected forwarding directory number during other hours. Thus, if the subscriber is following the usual schedule, he or she can simply press the "forwarding" button to forward telephone service to the appropriate wireline directory number when arriving at a new location in accordance with the schedule. Of course, if the subscriber is varying from the usual schedule reflected in the programmed profile, he or she can scroll through the list of forwarding directory numbers at any time to select another forwarding directory number.

The data structure 900 includes database tables 910, 920, 930 and 940. Each table includes at least two columns that correspond with each other. Table 910 includes a column 912 of forwarding directory number options marked in sequence from "1" to "N" and a column 914 of indices that are also numbered in sequence from "1" to "N." The indices of column 914 are associated with the forwarding numbers of column 912. The subscriber may scroll through the list of available forwarding numbers, which are sequentially displayed on the screen of the wireless unit 110. The user may also select any of the directory numbers as the desired forwarding directory number.

Table 920 includes a column 922 of scheduling parameters and a column 924 of indices numbered in sequence from "A" to "N." The indices of column 924 are associated with the scheduling parameters of column 922. Table 930 includes a column 932 of scheduling parameters and a column 934 of indices number in sequence from "AA" to "NN." The indices of column 934 are associated with the scheduling parameters of column 932. In table 940, the indices of table 910 are associated with the indexes of tables 920 and 930. Table 940 includes a column 942 of indices "A" to "N" and "AA" to "NN" of columns 924 and 934, respectively. Associated with the indices of column 942 are the indices of column 944. Column 944 includes the indices "1" to "N" of column 914.

The forwarding number options of table 910 are mapped to the scheduling parameters shown in tables 920 and 930 to permit the subscriber to program the wireless device to forward communications to different numbers at different times. For example, FIG. 9 shows a representative example of a forwarding telephone number "1" corresponding with a scheduling parameter of Monday through Friday from 9:00 AM to 5:00 PM. A second forwarding telephone number "2" also corresponds with a scheduling parameter of Monday through Friday from 9:00 AM to 5:00 PM. Those skilled in the art will appreciate that any of a wide variety of forwarding profiles may be implemented through the data structure 900.

Figure 10:
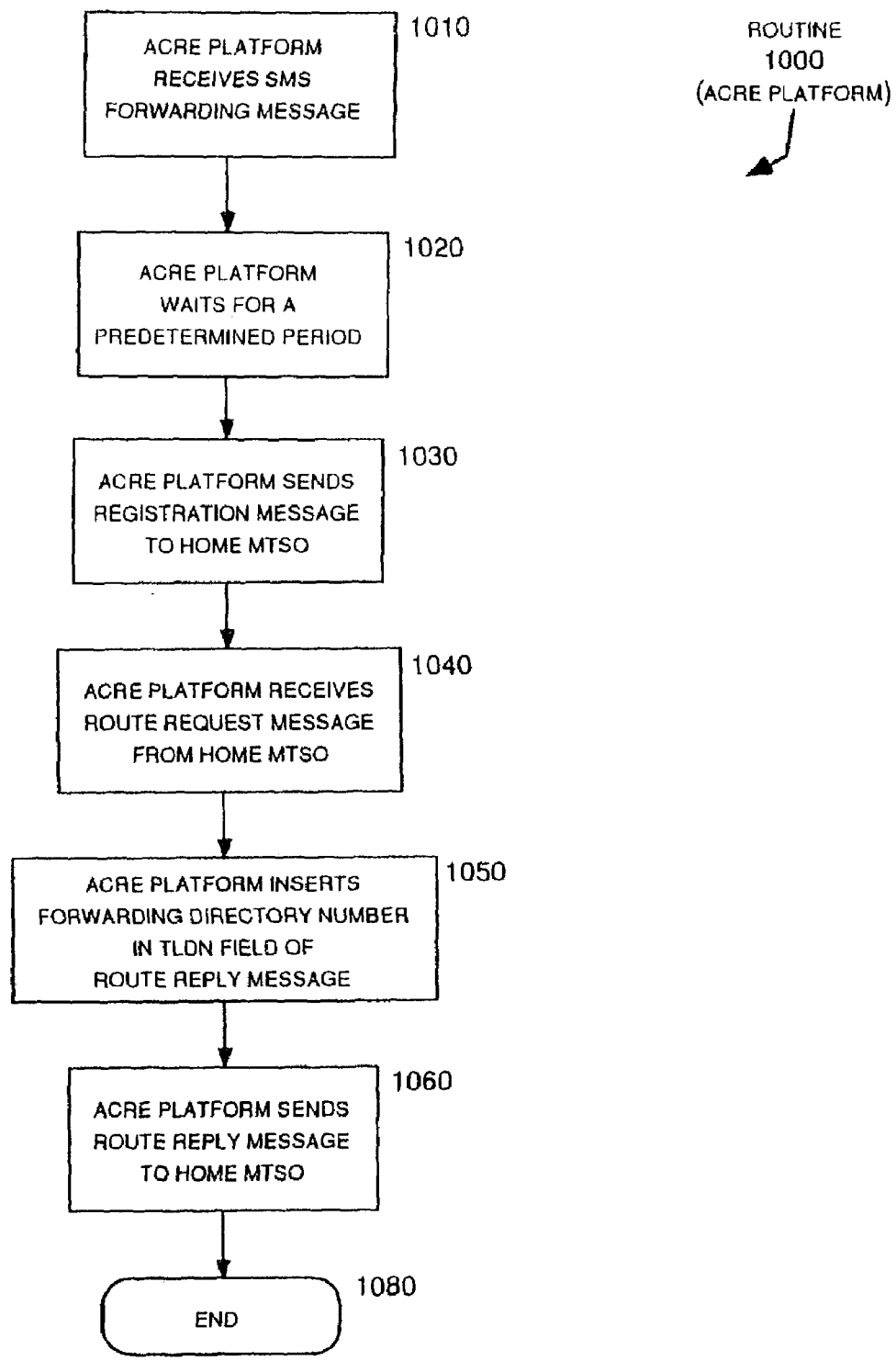
FIG. 10 is logic flow diagram illustrating a method implemented by a telephone network to support forwarding telephone service in accordance with an embodiment of the invention.

FIG. 10 is logic flow diagram illustrating a routine 1000 implemented by a telephone network to support forwarding telephone services requested by the ATF device 100. In this example, routine 1000 is performed by the ACRE platform 320. In step 1010, the ACRE platform 320 receives the SMS forwarding message from the ATF device 100, in this example by way of the wireless unit 110 and the MTSO 310. Step 1010 is followed by step 1020, in which the ACRE platform 320 waits for a predetermined duration before implementing the forwarding instruction. This duration should be at least as long as the interval that is required to power down after an SMS message is sent. This allows the wireless unit 110 to power down after the ACRE platform 320 receives the SMS forwarding message to ensure that the wireless unit 110 does not re-register and accidentally unforward the service before powering down.

Step 1020 is followed by step 1030, in which the ACRE platform 320 emulates a VLR by sending a registration to the home MTSO 310. This registration appears to the home MTSO 310 as if the wireless unit 110 is attempting to register for roaming service with another MTSO. The home MTSO 310 responds to any received route reply message by setting a flag in the HLR 340 record for the wireless unit 110 indicating that the ACRE platform 320 should be consulted to obtain routing instructions for subsequent incoming telephone calls directed to the wireless unit 110. If the home MTSO 310 has received an incoming telephone call directed to the wireless unit 110, this procedure is followed and the home MTSO 310 routes the incoming telephone calls to the TLDN received from the ACRE platform 320, which is the forwarding directory number 130. Thus, the home MTSO 310 subsequently transmits a route request message to the ACRE platform 320.

Step 1030 is followed by step 1040, in which the ACRE platform 320 receives the route request message from the home MTSO 310. Subsequently, when a call comes in, step 1040 is followed by step 1050, in which the ACRE platform 320 inserts the forwarding directory number 130 into the TLDN field of a route reply message. Step 1050 is followed by step 1060, in which the ACRE platform 320 transmits the route reply message to the home MTSO 310. Step 1060 is followed by the "END" step 1080, which concludes routine 1000.

In view of the foregoing, it will be appreciated that the invention provides an improved device for automatically forwarding telephone service for a telephone device, such as a wireless unit. It should be understood that the foregoing relates only to exemplary embodiments of the present invention, and that numerous changes may be made therein without departing from the spirit and scope of the invention as defined by the following claims.

The invention claimed is:

1. An automatic telephone service forwarding device comprising:
    a wireless telephone, further comprising:
        a memory adapted to store a scrollable list of potential forwarding directory numbers, wherein the memory stores the scrollable list of forwarding directory numbers in a table indexing scheduling parameters in a scheduling parameter table, the scheduling parameters indicating days of the week and times of day for which a forwarding number is to be used;
        a display device adapted to display a selected one of the potential forwarding directory numbers; and
        a forwarding button adapted to receive a command instructing the wireless telephone to automatically transmit a message instructing a telephone redirection device to forward telephone calls placed to a device directory number to the selected potential forwarding directory number in response to the scheduling parameters.

2. The automatic telephone service forwarding device of claim 1, wherein:
    the wireless telephone is configured to receive the potential forwarding directory number through keystrokes or voice commands.

3. The automatic telephone service forwarding device of claim 2, wherein:
    the wireless telephone is configured to automatically select certain potential forwarding directory numbers in accordance with a predefined time-based profile.

4. The automatic telephone service forwarding device of claim 3, wherein the predefined time-based profile includes a directory number and an associated scheduling parameter.

5. The automatic telephone service forwarding device of claim 1, wherein the wireless telephone is selected from a group consisting of: a pager, a personal digital assistant (PDA), a mobile computing device, home-based computing device, a messaging platform, an electronic mail device, or a device associated with telephone communications.

6. The automatic telephone service forwarding device of claim 1, wherein:
    the wireless telephone is configured to draw power from a socket.

7. The automatic telephone service forwarding device of claim 1, wherein the socket is either a base charging station for the wireless telephone or a power charging unit.

8. The automatic telephone service forwarding device of claim 1, further comprising:
    a power source adapted to provide power to the automatic telephone service forwarding device.

9. An automatic telephone service forwarding device comprising:
    a wireless communications device, comprising:
        a memory adapted to store a scrollable list of potential forwarding directory numbers, wherein the memory stores the scrollable list of forwarding directory numbers in a table indexing scheduling parameters in a scheduling parameter table, the scheduling parameters indicating days of the week and times of day for which a forwarding number is to be used;
        a display device adapted to display a selected one of the potential forwarding directory numbers; and
        a user interface adapted to receive a command instructing the wireless communications device to automatically transmit a message instructing a telephone redirection device to forward telephone calls placed to a device directory number to the selected potential forwarding directory number in response to the scheduling parameters.

10. The automatic telephone service forwarding device of claim 9, wherein:
    the wireless communications device is configured to receive the potential forwarding directory number through keystrokes or voice commands.

11. The automatic telephone service forwarding device of claim 10, wherein:
    the wireless communications device is configured to automatically select certain potential forwarding directory numbers in accordance with a predefined time-based profile.

12. The automatic telephone service forwarding device of claim 11, wherein the predefined time-based profile includes a directory number and an associated scheduling parameter.

13. The automatic telephone service forwarding device of claim 9, wherein the wireless communications device is selected from a group consisting of: a wireless telephone, a pager, a personal digital assistant (PDA), a mobile computing device, home-based computing device, a messaging platform, an electronic mail device, and a device associated with telephone communications.

14. The automatic telephone service forwarding device of claim 9, wherein:
    the wireless communications device is configured to draw power from a socket.

15. The automatic telephone service forwarding device of claim 14, wherein the socket is either a base charging station for the wireless communications device or a power charging unit.

16. The automatic telephone service forwarding device of claim 9, further comprising:
a power source adapted to provide power to the automatic telephone service forwarding device.

17. The automatic telephone service forwarding device of claim 9, wherein the user interface is further adapted to receive potential forwarding directory numbers from a user.

18. The automatic telephone service forwarding device of claim 9, further comprising:
a data port adapted to receive potential forwarding directory numbers.

19. The automatic telephone service forwarding device for a wireless communications device, comprising:
a memory adapted to store a scrollable list of potential forwarding directory numbers, wherein the memory stores the scrollable list of forwarding directory numbers in a table indexing scheduling parameters in a scheduling parameter table, the scheduling parameters indicating days of the week and times of day for which a forwarding number is to be used;
a user interface adapted to receive a selection of at least one forwarding directory number from a user;
a display adapted to display at least one selected forwarding directory number, and
a communications interface adapted to send a message to a telephone redirection device with at least one selected forwarding directory number for the wireless communications device in response to the scheduling parameters.

20. The automatic telephone service forwarding device of claim 19, further comprising:
a power source adapted to power the memory, user interface, display, and data interface.

21. The automatic telephone service forwarding device of claim 19, wherein the user interface is selected from a group consisting of: voice recognition equipment, a keypad, and a touch screen.

22. The automatic telephone service forwarding device of claim 19, wherein the communications interface is selected from a group consisting of: a short messaging service circuit, a short messaging circuit of an IS-136 TDMA digital telephone, a modem, a telephone device, and a wireless communications device.

23. The automatic telephone service forwarding device of claim 19, wherein the wireless communications device is selected from a group consisting of: a wireless telephone, a pager, a personal digital assistant (PDA), a mobile computing device, home-based computing device, a messaging platform, an electronic mail device, and a device associated with telephone communications.

* * * * *

UNITED STATES PATENT AND TRADEMARK OFFICE
CERTIFICATE OF CORRECTION

PATENT NO.        : 7,120,426 B2                                Page 1 of 1
APPLICATION NO. : 10/376380
DATED             : October 10, 2006
INVENTOR(S)       : Charles M. Link, II et al.

It is certified that error appears in the above-identified patent and that said Letters Patent is hereby corrected as shown below:

<u>Title Page</u>,
Item (62), Related U.S. Application Data, after "now", delete "abandoned" and insert therefor --Pat. No. 6,738,616 --.

Signed and Sealed this

Ninth Day of January, 2007

JON W. DUDAS
*Director of the United States Patent and Trademark Office*